United States Patent Office 3,798,222
Patented Mar. 19, 1974

3,798,222
SULFONATE DERIVATIVES OF 1,4-BIS (PROPIONYL)PIPERAZINE
Alexander Senning, Braband, and Hans Christian Buchholt, Risskov, Denmark, and Robert Bierling, Wuppertal-Elberfeld, Dieter Steinhoff, Bochum, and Gerhard Trossmann, Bonn-Bad Godesberg, Germany, assignors to Bayer Aktiengesellschaft, Leverkusen, Germany
No Drawing. Filed Sept. 14, 1971, Ser. No. 180,501
Claims priority, application Germany, Sept. 18, 1970, P 20 46 087.1
Int. Cl. C07d 51/70, 51/72
U.S. Cl. 260—268 C
6 Claims

ABSTRACT OF THE DISCLOSURE

Derivatives of 1,4-bis[3-(methylsulfonyloxy)propionyl]piperazine in which the methylsulfonyl groups are substituted by at least one halogeno, cyano or methylsulfonyl group and the piperazine ring optionally bears up to two lower alkyl groups are cytostatic agents. The compounds, of which 1,4-bis[3-(chloromethylsulfonyloxy)propionyl]piperazine is a typical embodiment, are obtained through the reaction of the appropriate 1,3-bis(3-iodopropionyl)piperazine and a salt of a substituted methanesulfonic acid.

DETAILED DESCRIPTION

The present invention relates to novel sulfonic acid esters, to their preparation, to their use as cytostatic agents and to compositions adapted for this use.

In particular, the present invention pertains to compounds of the formula:

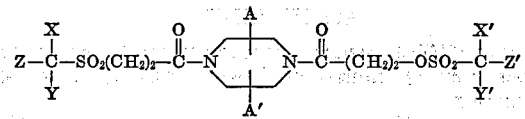

wherein each of A and A', independent of the other, is hydrogen or an aliphatic radical,
each of Z and Z', independent of the other, is halogeno, cyano, pseudo halogeno, or methylsulfonyl, and
each of X, X', Y and Y' is hydrogen, halogeno, cyano, pseudo halogeno or methylsulfonyl.

A preferred group of compounds are those of Formula I wherein A and A' are each hydrogen or lower alkyl, Z and Z' are each halogeno, cyano or methylsulfonyl and X, X', Y and Y' are each hydrogen, halogeno, cyano or methylsulfonyl.

Aliphatic radicals A and A' are identical or different straight-chain or branched alkyl radicals, preferably lower alkyl with 1 to 6, especially 1 to 4, carbon atoms, such as methyl, ethyl, propyl, isopropyl, butyl, hexyl and the like. Methyl is preferred.

Halogeno includes fluoro, chloro, bromo and iodo, preferably chloro, bromo and iodo.

Pseudohalogeno includes —SCN, —OCN, —NCO and —N$_3$.

The new sulfonic acid esters are obtained if a diiodo compound of the Formula II:

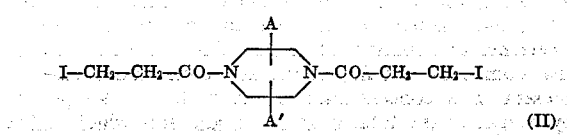

wherein

A and A' are as defined above is allowed to react with about the stoichiometric amount of a sulfonate of Formula III:

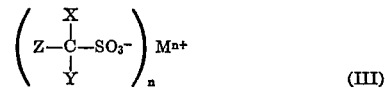

wherein

X, Y and Z are as defined above,
M is a cation which forms a sparingly soluble iodide, and
n has a value of 1 or 2.

Compounds of Formula I wherein

A and A' are each hydrogen or the methyl group,
X, X', Y and Y' are each hydrogen, and
Z and Z' are each chloro, bromo, iodo or methylsulphonyl are particularly preferred.

The silver cation is especially preferred as an example of the cation M which forms a sparingly soluble iodide.

The starting compounds of the Formulas II and III are preferably employed in approximately the stoichiometrically required amounts. The reaction is carried out in the temperature range of from about 20 to about 150° C., preferably of about 60 to about 100°, preferably in the presence of an organic diluent. Polar aprotic solvents, such as acetonitrile, are preferred. The reaction can however also be carried out without diluents.

The sulfonates (III) which serve as starting compounds are known or can be obtained according to known processes. As examples of such sulfonates there may be mentioned:

CH$_2$Cl—SO$_3$$^-$Ag$^+$ (melting point: 155.5–157.5° C.)
CHCl$_2$—SO$_3$$^-$Ag$^+$ (decomposes above 150° C.)
CH$_2$Br—SO$_3$$^-$Ag$^+$ (melting point: 196–198° C.)
CHBr$_2$—SO$_3$$^-$Ag$^+$ (melting point: 184–185° C.)
CH$_2$I—SO$_3$$^-$Ag$^+$ (melting point: 178–180.5° C.)
NC—CH$_2$—SO$_3$$^-$Ag$^+$ (melting point: 255–257° C.)
CH$_3$—SO$_2$—CH$_2$—SO$_3$$^-$Ag$^+$ (melting point: 186–190° C.)

The following sulfonic acids can also be used:

CHI$_2$—SO$_3$H
CI$_3$—SO$_3$H, CHBrCl—SO$_3$H, CHClI—SO$_3$H,

CCl$_3$—SO$_3$H

CF$_3$—SO$_3$H, CHBrI—SO$_3$H, CBrI$_2$—SO$_3$H, CBr$_2$I—SO$_3$H and CHF$_2$—SO$_3$H.

The following are typical of the diiodo compounds of Formula II which can be manufactured according to known methods (see, e.g. German Auslegeschrift 1,138,781):

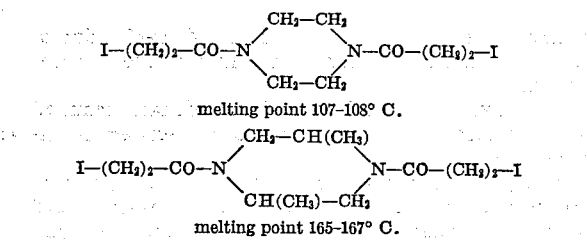

melting point 107–108° C.

melting point 165–167° C.

The reaction can be typified by the following equation:

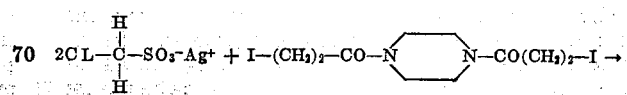

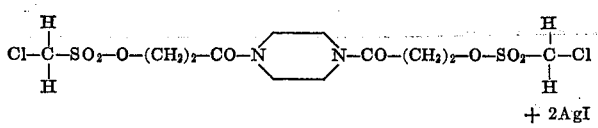

$+ 2AgI$

The manufacture of the compounds according to the invention will be explained with the aid of the following examples.

EXAMPLE 1

11.9 g. of silver chloromethanesulfonate, 13.0 g. of 1,4-bis-3-iodopropionyl)-piperazine and 100 ml. of dry acetonitrile are heated for 1 hour under reflux, with stirring. The warm reaction mixture is filtered, and the residue is extracted with boiling acetonitrile. The combined acetonitrile solutions are concentrated in vacuo, whereupon the residue crystallizes out. The residue is successively washed with cold water, ethanol and ether, and is dried. After recrystallization from acetonitrile, 7.3 g. of 1,4-bis-(3-(chloromethanesulfonyloxy) - propionyl) - piperazine of melting point 139–141° C. are obtained.

The following are obtained analogously.

EXAMPLE 2

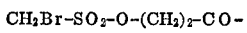

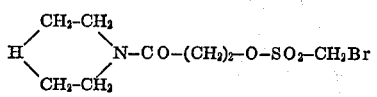

melting point: 146–148° C. from 1,4-bis-(3-iodopropionyl)piperazine and silver bromomethanesulfonate.

EXAMPLE 3

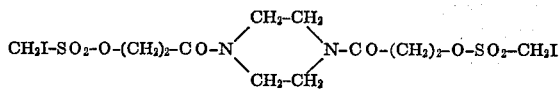

melting point: 136–139° C. from 1,4-bis-(3-iodopropionyl)piperazine and silver iodomethanesulfonate.

EXAMPLE 4

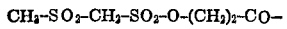

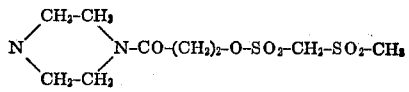

melting point: 136–143° C. from 1,4-bis-(3-iodopropionyl)piperazine and silver methylsulfonylmethanesulfonate.

EXAMPLE 5

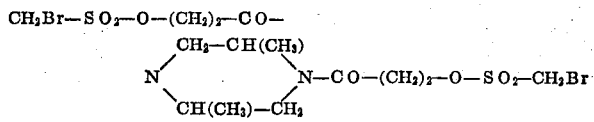

melting point: 154.5–156.5° C. from 1,4-bis-(3-iodopropionyl)-2,5-dimethylpiperazine and silver bromomethanesulfonate.

The silver methylsulfonylmethanesulfonate required for the manufacture of the compound described as Example 4 is obtained as follows:

114.0 g. of methanesulfonyl chloride are added dropwise over the course of 30 minutes to a mixture of 210 ml. of triethylamine and 400 ml. of anhydrous acetonitrile, at −40° C., with stirring. The mixture is stirred for a further hour at −40° C. and 9.0 ml. of water are added, again at −40° C. After a further 15 minutes' stirring at −40° C., the mixture is filtered and the filtrate is concentrated in vacuo. After adding 500 ml. of 2 N sodium hydroxide, 60 g. of crystals of melting point 235–240° C. are obtained, which are filtered off. After recrystallization from ethanol/water, the sodium methylsulfonylmethanesulfonate melts between 239° and 241° C. 40 g. of sodium methylsulfonylmethanesulfonate are dissolved in 1 liter of water and passed through an ion exchanger column with a polystyrene synthetic resin, containing sulfonic acid groups, as the ion exchanger. The aqueous solution of the free methylsulfonylmethanesulfonic acid is digested with 69 g. of silver carbonate, whereupon 40 g. of silver carbonate remain undissolved and are filtered off. The filtrate is concentrated in vacuo, with the bath temperature not exceeding 60° C. After adding methanol, 45 g. of crystalline silver methylsulfonylmethanesulfonate of melting point 186–190° C. are obtained.

As already mentioned, the new compounds show a good cytostatic activity, which permits their use in medicine, especially for combatting lymphatic leukemia. Making the new compounds available hence represents an enrichment of the art.

The activity of the compounds according to the invention can be conveniently observed in the model of transplanted lymphatic leukemia L 1210 on mice as follows:

Mice weighing 18–22 g. (strain B6DF1) were injected intraperitoneally with $2 \times 10^5$ leukemia cells (L 1210) in 0.2 ml. of ascites fluid.

The treatment was carried out 4 times, on successive days, by intraperitoneal administration, and started 24 hours after the transplantation of the leukemia cells.

The duration of the test was 2–3 weeks.

To assess the results of the test, the survival time index (ST index) was determined as follows:

If the survival time 50 of the control group is treated as 100%, it is possible, using the formula $$\text{ST index} = \frac{\text{ST 50 of the treated group} \times 100}{\text{ST 50 of the control group}}$$

to compute a quotient which can be treated as an index of the change in the ST under the treatment.

ASSESSMENT

Values <100% denote a reduced survival time of the treated group of animals and hence a toxic action of the preparation.

Values >100% denote an increased survival time 50, which, depending on the level of the index, express an inhibition of the growth of the leukemia cells.

The results are shown in Table 1.

TABLE 1

| Compound from— | Leukemia L 1210, optimum dose in mg./kg. of body weight 4× intraperitoneally | Survival time index, percent |
|---|---|---|
| Comparison substance [1] | 100 | 340 |
| Example number: | | |
| 1 | 10 | 526 |
| 5 | 10 | 653 |

[1] The comparison substance used was the compound of the formula:

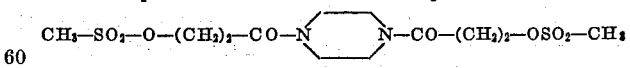

from German Patent Specification No. 1,177,162.

The new compounds are preferably administered orally and can be used either as such or in combintion with non-toxic, inert, pharmaceutically tolerated excipients. Suitable forms for administration, in combination with various inert excipients, are tablets, dragées, capsules, granules, aqueous suspensions and emulsions, non-aqueous emulsions and suspensions, syrups and the like. Such excipients include solid diluents or fillers, aqueous media, as well as various non-toxic organic diluents and the like. Of course, tablets and the like can be provided with a sweetener and similar substances. The therapeutically active compound should, in the above-mentioned case, be present in a concentration of about 0.5 to 90 percent by weight of the total mixture, in amounts which suffice to achieve dosage range which is cytostatically effective.

The formulations are manufacture according to conventional techniques, for example by extending the active substances with diluents and/or excipients, optionally using emulsifiers and/or dispersing agents, such as water, nontoxic organic solvents or diluents, such as paraffins, vegetable oils, such as groundnut oil and sesame oil, alcohols, such as ethyl alcohol or glycerol, glycols, such as propylene glycol or polyethylene glycol, solid excipients, such as, for example, natural rock powders for example kaolins, aluminas, talc or chalk, synthetic rock powders, such as highly disperse silica and silicates, sugars as for example unrefined sugar, lactose and glucose, emulsifiers, such as non-ionic and anionic emulsifiers as for example polyoxyethylene-fatty acid esters, polyoxyethylene-fatty alcohol ethers, alkylsulfonates and arylsulfonates, dispersing agents, such as lignin, sulfite waste lyes, methylcellulose, starch and polyvinylpyrrolidone and lubricants, such as magnesium stearate, talc, stearic acid and sodium lauryl sulfate.

Apart from the excipients mentioned, tablets can of course also contain additives, such as sodium citrate, calcium carbonate and dicalcium phosphate, together with various further substances such as starch, preferably potato starch, gelatin and the like. Furthermore, lubricants such as magnesium stearate, sodium lauryl sulfate and talc can additionlly be used for making tablets. In the case of suspensions and emulsions, the active substances can be mixed with various flavor improving agents or dyestuffs in addition to the above-mentioned auxiliaries.

The active substances can also be contained in the form of dosage units in capsules, tablets, pastilles, dragées, ampoules and the like, each dosage unit being so adapted as to yield a single dose of the active constituent.

The new compounds can also be present in the formulations as mixtures with other known active substances.

In general it has proved advantageous to administer amounts of about 5 mg. to 50 mg./kg. of body weight per day to achieve cytostatically effective results. Nevertheless it will at times be necessary to deviate from the amounts mentioned, and in particular to do so as a function of the body weight of the test animal, the method of administration, the type of animal and its individual behavior towards the cytostatic agent, and type of formulation, and the administration regimen. Thus it will in some cases suffice to use less than the above mentioned minimum amount, while in others the upper limit mentioned must be exceeded. Where larger amounts are administered, it can be advisable to divide these into several individual administrations over the course of the day. The same dosage range is envisaged for administration in human medicine and in veterinary medicine.

What is claimed is:

1. A compound of the formula:

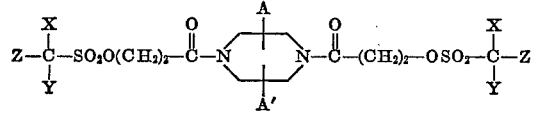

in which

A and A' are each hydrogen or primary or secondary lower alkyl of 1 to 6 carbon atoms, Z is chloro, bromo or iodo, and X and Y are each hydrogen, chloro, bromo or iodo.

2. A compound according to claim 1 wherein A and A' are each hydrogen or methyl; Z is chloro, bromo or iodo and X and Y are each hydrogen.

3. The compound according to claim 1 which is 1,4-bis[3-(chloromethylsulfonyloxy)propionyl]piperazine.

4. The compound according to claim 1 which is 1,4-bis[3 - (bromomethylsulfonyloxy)propionyl]-2,5-dimethylpiperazine.

5. The compound according to claim 1 which is 1,4-bis[3-(bromomethylsulfonyloxy)propionyl]piperazine.

6. The compound according to claim 1 which is 1,4-bis[3-(iodomethylsulfonyloxy)propionyl]piperazine.

References Cited

UNITED STATES PATENTS

| | | | |
|---|---|---|---|
| 3,293,253 | 12/1966 | Horrom | 260—268 C |
| 3,238,204 | 3/1966 | Hauptschein | 260—268 C |
| 3,511,840 | 5/1970 | Tesoro | 260—268 C |
| 3,538,640 | 1/1971 | Shen | 260—268 C |
| 3,632,511 | 1/1972 | Ligo | 260—268 C |

FOREIGN PATENTS

| | | | |
|---|---|---|---|
| 1,138,781 | 10/1962 | Germany | 260—268 C |
| 921,559 | 3/1963 | Great Britain | 260—268 C |
| 1,003,349 | 9/1965 | Great Britain | 260—268 C |

OTHER REFERENCES

Physician's Desk Reference, 21st ed., p. 523 (1966).

DONALD G. DAUS, Primary Examiner

U.S. Cl. X.R.

260—268 CN, 430, 513 R; 424—250